Nov. 4, 1924.  
W. BURMESTER  
ANIMAL CATCHER  
Filed May 6, 1922  
1,514,429  
2 Sheets-Sheet 1
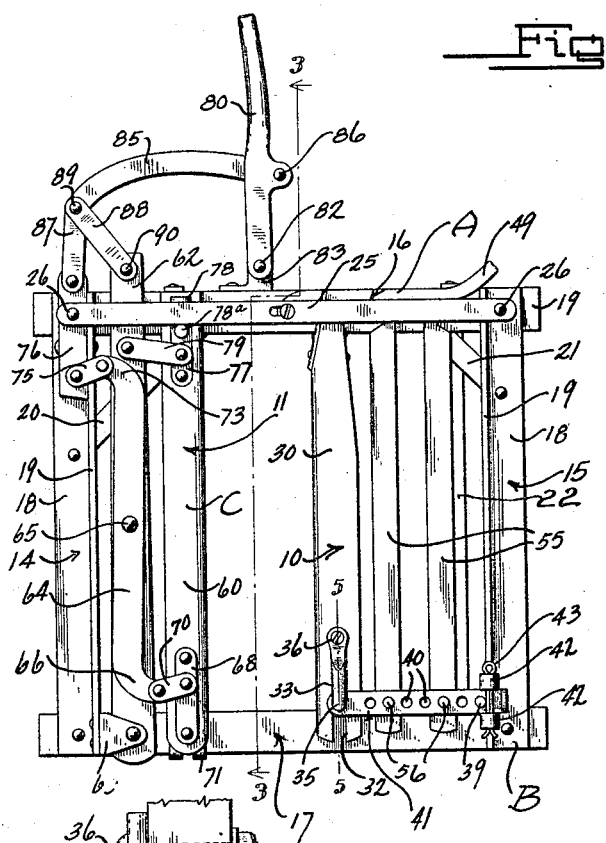
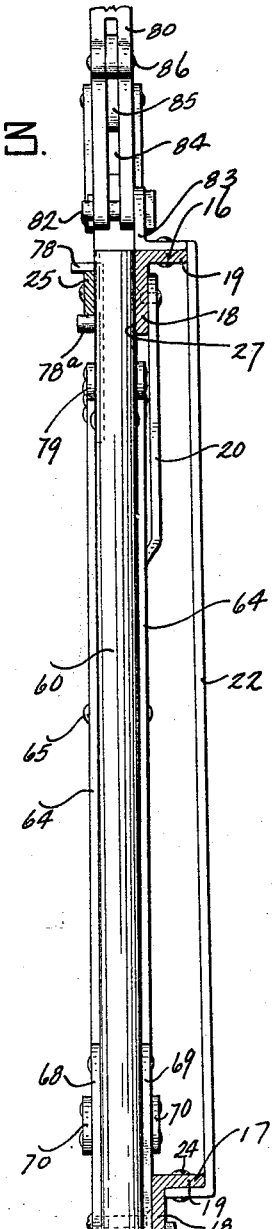
Inventor  
William Burmester Nov. 4, 1924. 1,514,429
W. BURMESTER
ANIMAL CATCHER
Filed May 6, 1922 2 Sheets-Sheet 2
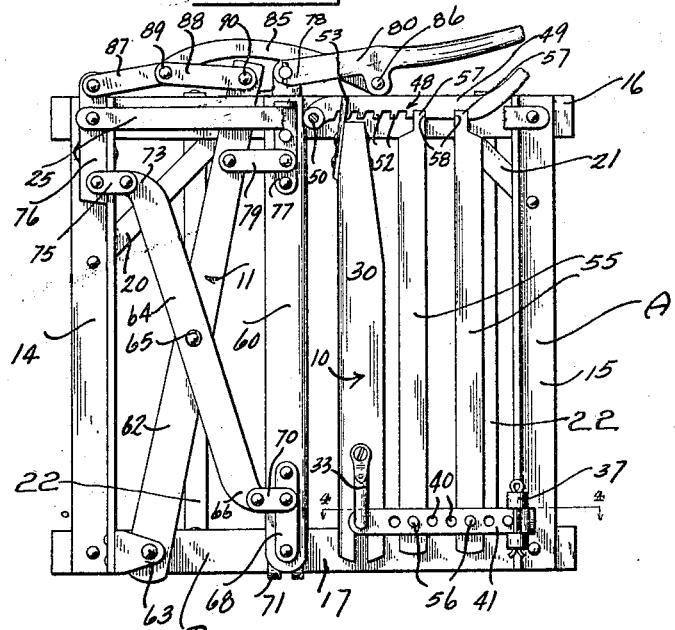
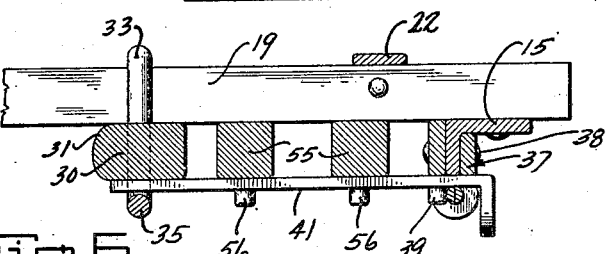
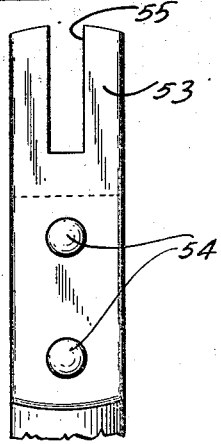
Inventor
William Burmester
By Lancaster and Allwine
Attorneys Patented Nov. 4, 1924.

1,514,429

UNITED STATES PATENT OFFICE.

WILLIAM BURMESTER, OF PENDER, NEBRASKA.

ANIMAL CATCHER.

Application filed May 6, 1922. Serial No. 558,947.

*To all whom it may concern:*

Be it known that I, WILLIAM BURMESTER, a citizen of the United States, residing at Pender, in the county of Thurston and State of Nebraska, have invented certain new and useful Improvements in Animal Catchers, of which the following is a specification.

This invention relates to improvements in devices for catching animals.

The primary object of the invention is the provision of an improved device for manual operation to catch hogs and cattle, whereby the handling of the same may be facilitated.

An important object of this invention is the provision of an improved catching device, which may be suitably adjusted to conform to the type and size of animal it is desired to trap, and perform its operation without injuring the animal during the trapping operation.

A further object of the invention is the provision of a hog catching device in which an operator has absolute manual control over the same, so that the same may be effectively regulated to prevent choking or crippling of a hog entrapped therein.

A further object of the invention is the provision of a device of the above mentioned character, which may be used as a gate in stock yards and like places for controlling the passing of swine or cattle therethrough.

Other objects and advantages will be apparent during the course of the following detailed description.

In the accompanying drawings, forming a part of this specification, and wherein similar reference characters designate corresponding parts throughout the several views, Figure 1 is a front elevation of the improved hog catcher showing the same in open position.

Figure 2 is a front elevation of the improved hog catcher and showing the same in closed position.

Figure 3 is an enlarged cross sectional view, taken on the line 3—3 of Figure 1.

Figure 4 is an enlarged fragmentary sectional view taken substantially on the line 4—4 of Figure 2.

Figure 5 is an enlarged fragmentary view partly in section, taken on the line 5—5 of Figure 1.

Figure 6 is an enlarged view, showing the upper end of a stanchion employed in the improved hog catcher.

In the drawings, wherein for the purpose of illustration is shown the preferred embodiment of the invention, the letter A designates the improved catcher, including the frame B and stanchion arrangement C. The stanchion arrangement preferably comprises a stanchion mechanism 10 for adjustment to assume a set position in the frame A during an animal catching operation, and a stanchion mechanism 11 for manual operation to relatively move the same with respect to the stanchion mechanism 10 during an animal catching operation.

Referring to the frame B, the same is preferably formed of angle bars in substantially square formation, the same including the vertically positioned side bars 14 and 15 and the top and bottom horizontally positioned frame bars 16 and 17 respectively. Each of the bars 14, 15, 16 and 17 includes an attaching leg 18 and the outstanding leg 19. For reinforcing purposes, the diagonal brace members 20 and 21 are provided, for respectively reinforcing the proximate ends of the bars 14 and 15, and 15 and 16; the braces primarily taking up strain upon said bars incident to use of the stanchion mechanisms 10 and 11. Vertical brace bars 22 are preferably provided having the ends 23 thereof outturned in parallel relation for attachment as by rivets 24 to the outstanding leg portions 19 of the top and bottom angle bars 16 and 17. These bars 22 are positioned adjacent the side frame bars 14 and 15, in order that the opening in the frame B remains unobstructed, so that hogs or other animals may pass therethrough. It is preferred that a guide bar 25 be fastened as by rivets 26 to the frame A and disposed in parallel relation to the flat angle bar 16 and spaced therefrom by reason of the resting of the same upon the outer edges of the outstanding leg portions 19 of the side frame bars 14 and 15, substantially as is illustrated in Figures 1 and 3 of the drawings. Thus, the bar 25 and the attaching leg 18 of the frame top bar 16 are disposed in spaced parallel relation to provide a slot 27, so to speak, for reception of certain sliding and moving parts of the stanchion mechanisms 10 and 11 to be subsequently described.

Referring to the stanchion mechanism 10, the same includes the stanchion member 30, preferably formed of wood and rounded as at 31 upon the side thereof which faces the movable stanchion mechanism 11. One end of the stanchion 30 is slotted inwardly as at 32, to receive a novel shaped pin member 33. This pin 33 has an end 34 thereof, which is looped as at 35 and secured upon its outer end as by a bolt element 36 to the member 30. A bracket 37 is provided, as a part of the improved hog catcher A, riveted or otherwise secured as at 38, and having a pin or lug 39 extending upwardly therefrom for receiving a perforation 40 of an L-shaped bar 41. The bracket 37 is preferably provided with a pair of aligning barrels 42 adapted for receiving a cotter pin 43, whereby the bar 40 may be clamped to the bracket 37 in adjustable manner. The looped portion 35 of the pivot pin 33 is pivotally mounted in an end aperture 45 of the bar 41. In order to stabilize the pivot action of the stanchion member 30, the end 46 of said pin 33, opposite to the loop portion 35 thereof is hook shaped, to slidably receive the outstanding leg portion 19 of the bottom bar 17 of the frame B. By this means, the bar 41 may be slid laterally of the frame B, so that the lug or pin 39 of the bracket 37 may be selectively positioned in any perforation 40 of said bar 41, in order to locate the pin 33 in a determined relation along the frame bar 17 so that the stanchion member 30 may be pivoted in that position which will best cooperate with the movable stanchion mechanism 11 for the catching of different sized animals. A pawl and ratchet mechanism 48 is preferably provided for securing the free end of the stanchion member 30 and which includes the swinging catch arm 49 pivoted as at 50 in the pocket or slot 27. The lower face of the catch bar 49 is provided with teeth 52 adapted for co-operating with the plate 53 which is riveted or otherwise secured as at 54 upon the free end of the stanchion member 30, so that a free portion thereof extends upwardly from the stanchion member 30 and is notched as at 55 inwardly for receiving the catch bar 49. The teeth 52 are adapted for engagement in this notch 55, and whereby the stanchion member 30 may be held in a fixed and determined position in the frame B, substantially as is illustrated in Figure 2 of the drawings.

The stanchion member 30 as can readily be seen from the drawings, is adapted for adjustment over substantially one-half the width of the frame B. When the stanchion 30 is disposed adjacent the center of the frame B and substantially as is illustrated in Figures 1 and 2 of the drawings, it can be seen that a relatively large space occurs in the frame B intermediate the stanchion 30 and the side bar 15 of the frame B. In order that this opening may form a barrier to prevent passage of hogs therethrough, it is preferred that retaining bars 55 be provided, having lugs or pins 56 upon an end of each adapted for disposition in the perforations 40 of the adjusting bar 41; said bars 55 when in such position being disposed intermediate the adjusting bar 41 and the attaching leg 18 of the bottom frame bar 17, so that an end of each retaining bar 55 is pivoted to said bar 41. The upper ends of the retaining bars 55 are reduced, as at 57 and adapted for disposition in the pockets 58 provided in the catch bar 49, so that the free ends of said retaining bars 55 may be locked when the stanchion member 30 is in fixed position. The retaining bars 55 may readily be detached from the stanchion mechanism 10 should it be desired to use the improved catcher A for trapping relatively large hogs, so that the stanchion 30 is of necessity disposed adjacent the side bar 15. It is to be noted that when the catch arm 49 is in position to engage the plate 53 of the stanchion member 30, said stanchion member 30 is in secure and fixed position and cannot be moved except by manually lifting the arm 49. Considerable adjustment of said member 30 is given, merely by the disposition of the plate 53 in various spaces intermediate the arm teeth 52. However, the pivoted end of the stanchion member 30 may be adjusted, as hereinbefore described.

The operating stanchion mechanism 11 preferably includes a stanchion member 60 which is adapted for horizontal sliding between the frame bars 14 and 15. In order that the stanchion 60 may be operated in proper cooperation with the fixed stanchion 30, it is desired that the movable stanchion mechanism 11 maintain its vertical position during any horizontal sliding action of the same. A rocker arm 62 is pivoted, upon one end thereof, as by bracket 63, to the outstanding leg portion 19 of the side bar 14, adjacent to the attachment of the same to the frame bar 17. The free end of the rocker arm 62 is slidably disposed within the pocket 27 above described. A pair of lever arms 64 are pivoted midway of their ends, as by a pin 65, upon the outer and inner sides of the rocker arm 62. Ends 66 of said lever arms 64 adjacent the pivotal connection of the rocker arm 62 with the bracket 63 are outturned toward the stanchion 60, and pivotally secured to wear plates 68 and 69 of the stanchion 60 as by links 70. It is to be noted that the end 71 of the wear plate 69 is hook shaped, to engage the attaching leg portion 18 of the bottom frame bar 17, so that the stanchion 60 may be slidably moved upon said frame bar 17. The lever arms 64 are outturned toward the frame bar 14, and are pivotally secured thereto as by link elements 75. To effect such pivoting action, a filler member 76 is provided, the same being attached to the frame bar 14. The upper end of the movable stanchion member 60 is preferably provided with a counter sunk plate 77, which has an outturned end 78 thereon, whereby the upper end of the stanchion member 60 may be slidably disposed in the pocket 27, against liability of displacement. Link members 79 are provided for securing of the upper ends of the rocker arm 62 and sliding stanchion 60.

From the foregoing, it can be seen that should the free end of the rocker arm 62 be moved within the frame B, the stanchion 60 will be horizontally slid upon the frame B.

In order to facilitate the manual operation of the lever 62, the operating lever 80 is pivoted as at 82 to a bracket 83 upon the top frame bar 16. The pivoted portion of the operating lever 80 is bifurcated to provide the slot 84 in which the arcuate link 85 is pivoted for sliding, as at 86. Connecting links 87 and 88 are pivoted at an end of each to the filler piece 76 and free end of the rocker bar 62 respectively, and pivoted at their opposite ends to a common pin 89 upon the opposite end of the arcuate link 85 with respect to lever 60. By reason of the fact that the arcuate link 85 is pivoted remote from the pivoting point of the operating lever 80, it can readily be seen that by oscillating the same, the tendency of the links 87 and 88 will be to rock the lever 62 for sliding the stanchion member 60 within the frame B. When the operating lever 80 is in its closed position, as is illustrated in Figure 2 of the drawings, the pivot pin 86 is disposed closer to the top frame bar 16 than the pin 90 which pivots the link 88 to the rocker lever 62, so that when in this position, the operating mechanism for the stanchion 60 is thrown past dead center to hold the stanchion member 60 in a fixed position for securing of a hog between the stanchion members 30 and 60.

In operation, the stanchion member 30 is properly adjusted, as above described, so that the same is suitably positioned in the frame B, consistent with the size of the animal to be caught in the improved device A. When it is desired to trap a hog or other animal, the improved stanchion mechanism 11 is thrown open, substantially as is illustrated in Figure 1 of the drawings, so that a space is provided intermediate the stanchions 30 and 60, whereby a hog or other animal may pass therethrough. At the appropriate time, a person throwing the lever 80 into closed position so that the operating device of the stanchion device 11 is past dead center, moves the stanchion 60 toward the stanchion 30, so that the animal is entrapped intermediate the stanchions 30 and 60 and can be handled in a facile manner.

From the foregoing, it can be seen that an improved catcher has been provided, which is relatively simple in construction, yet has been so designed that the same may be adjusted for capturing of various sizes of animals. In addition to this, the improved device has been arranged that an animal may be captured without unnecessary injury to the same, as by choking or otherwise crippling by the squeezing action of the stanchions.

Various changes in the shape, size and arrangement of parts may be made to the form of invention herein shown and described, without departing from the spirit of the invention or the scope of the claims.

I claim:

1. In a device of the class described, the combination of a frame having a lug thereon, a bar having a plurality of perforations therein adapted for receiving said frame lug, means for attaching said bar to said frame with said lug in a selected one of said perforations, a stanchion, means pivotally mounting one end of said stanchion to the end of said bar, whereby said bar may be adjusted laterally of said frame for moving the pivoted end of said stanchion therewith, a pawl arm mounted upon said frame adapted for adjustable engagement with the free end of said stanchion to secure said free end of the stanchion in a predetermined relation within said frame, and a second stanchion mounted in said frame for cooperation with the first mentioned stanchion.

2. In a device of the class described, the combination of a frame having a lug thereon, a bar having a plurality of perforations therein adapted for receiving said frame lug, means for attaching said bar to said frame with said lug in a selected one of said perforations, a stanchion, means pivotally mounting one end of said stanchion to the end of said bar whereby said bar may be adjusted laterally of said frame for moving the pivoted end of said stanchion therewith, a pawl arm mounted upon said frame adapted for adjustable engagement with the free end of said stanchion to secure said free end of the stanchion in a predetermined relation within said frame, a second stanchion mounted in said frame for cooperation with the first mentioned stanchion, and bars having pins thereon adapted for secure mounting in the perforations of said bar upon an end thereof, and adapted to have the other ends engaged by said pawl, whereby said bars may be cooperatively associated with said first mentioned stanchion in properly guiding animals between the first and second mentioned stanchions.

3. In a device of the class described, the combination of a frame, a stanchion member, a rocker arm pivotally mounted at one end to said frame, a relatively long link pivotally connected intermediate its ends at a point remote from the pivoted end of said rocker arm, means pivotally linking one end of said relatively long link to said frame, means pivotally linking the other end of said relatively long link adjacent one end of said stanchion, means linking the other end of said stanchion adjacent the free end of said rocker arm, an operating mechanism for swinging said rocker arm so that said stanchion will be slid in said frame, and a second stanchion for cooperation with said first mentioned stanchion.

4. An animal catcher comprising a frame; a movable stanchion embodying a stanchion bar slidable in said frame, and expansible device for movement of said stanchion bar embodying a rocker arm; and manual operating means comprising links connected to said frame and rocker arm, a hand engaging lever, and a connecting link pivoted to said hand engaging lever and said first mentioned links.

WILLIAM BURMESTER.